Feb. 18, 1964   F. C. ALPERS   3,121,869
RADAR RANGE TRACKING SYSTEM
Filed Dec. 28, 1960   5 Sheets-Sheet 1

INVENTOR.
FREDERICK C. ALPERS
BY
ATTORNEYS

Feb. 18, 1964    F. C. ALPERS    3,121,869
RADAR RANGE TRACKING SYSTEM
Filed Dec. 28, 1960    5 Sheets-Sheet 4

INVENTOR.
FREDERICK C. ALPERS
BY
ATTORNEYS

Feb. 18, 1964    F. C. ALPERS    3,121,869
RADAR RANGE TRACKING SYSTEM
Filed Dec. 28, 1960    5 Sheets-Sheet 5

INVENTOR.
FREDERICK C. ALPERS
BY
ATTORNEYS

United States Patent Office 3,121,869
Patented Feb. 18, 1964

3,121,869
RADAR RANGE TRACKING SYSTEM
Frederick C. Alpers, Riverside, Calif., assignor to the United States of America as represented by the Secretary of the Navy
Filed Dec. 28, 1960, Ser. No. 79,081
1 Claim. (Cl. 343—7.3)
(Granted under Title 35, U.S. Code (1952), sec. 266)

The invention herein described may be manufactured and used by or for the Governmxent of the United States of America for governmental purposes without the payment of any royalties thereon or therefor.

The present invention relates to a radar range tracking system and more particularly to a radar range tracking system wherein tracking is accomplished by generating early and late tracking gates which center on the leading edge of a return signal to give more accurate range information.

Older systems for radar range tracking have used either a human observer operating a ranging control to keep a marker pulse in range coincidence with a desired target as viewed on a radar indicator display, or an automatic tracking circuit which maintains early and late tracking gates, centered on the return signal, in range.

The disadvantage of the first system in requiring a human operator is obvious. The second system has the disadvantage of tending to follow on a time basis the center of a pulsed radar signal, where the timing of the center depends on pulse duration, receiver characteristics, and the shape of the target, as well as on range. Also, a target signal may be intentionally increased in duration by enemy countermeasures action so that tracking action which follows the center of the return is mislead.

An object of the present invention is to provide an improved radar range tracking system.

Another object is to provide a radar range tracking system which tracks on the leading edge of a radar signal.

A further object is to provide a radar range tracking system for obtaining more accurate range information.

Figure 1:
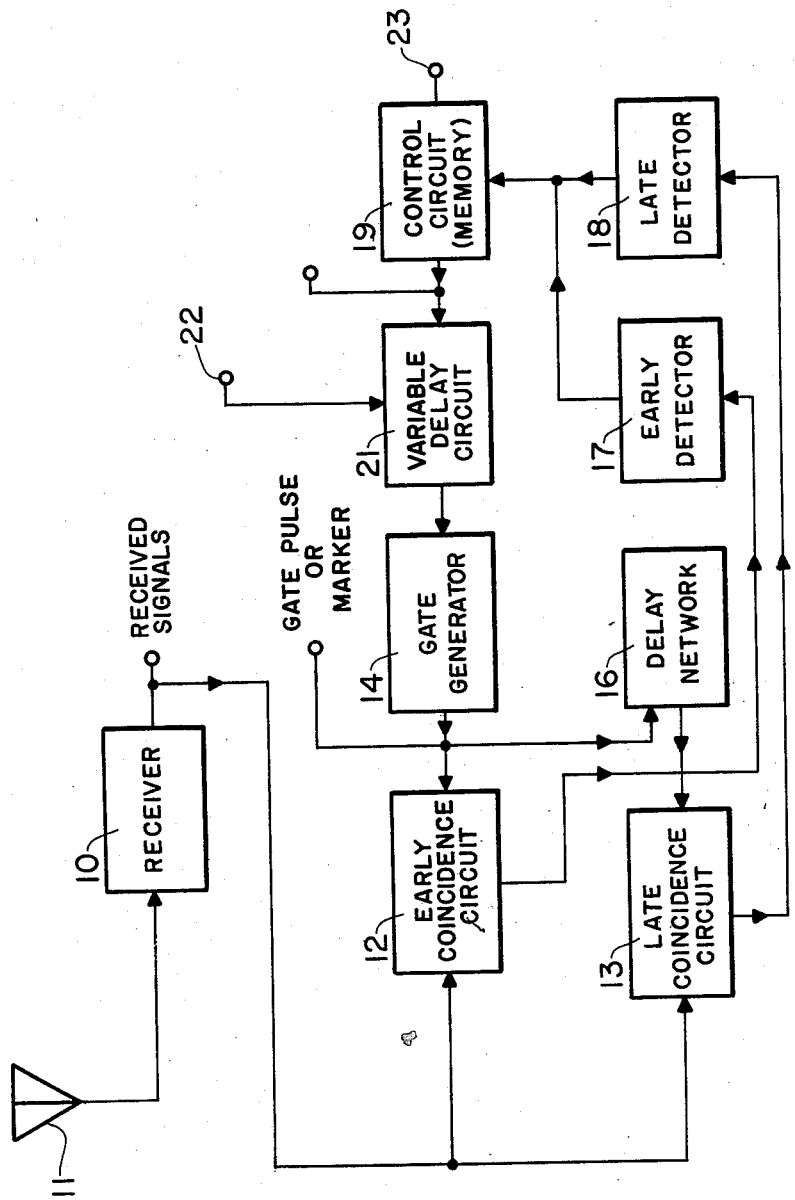
Figure 2:
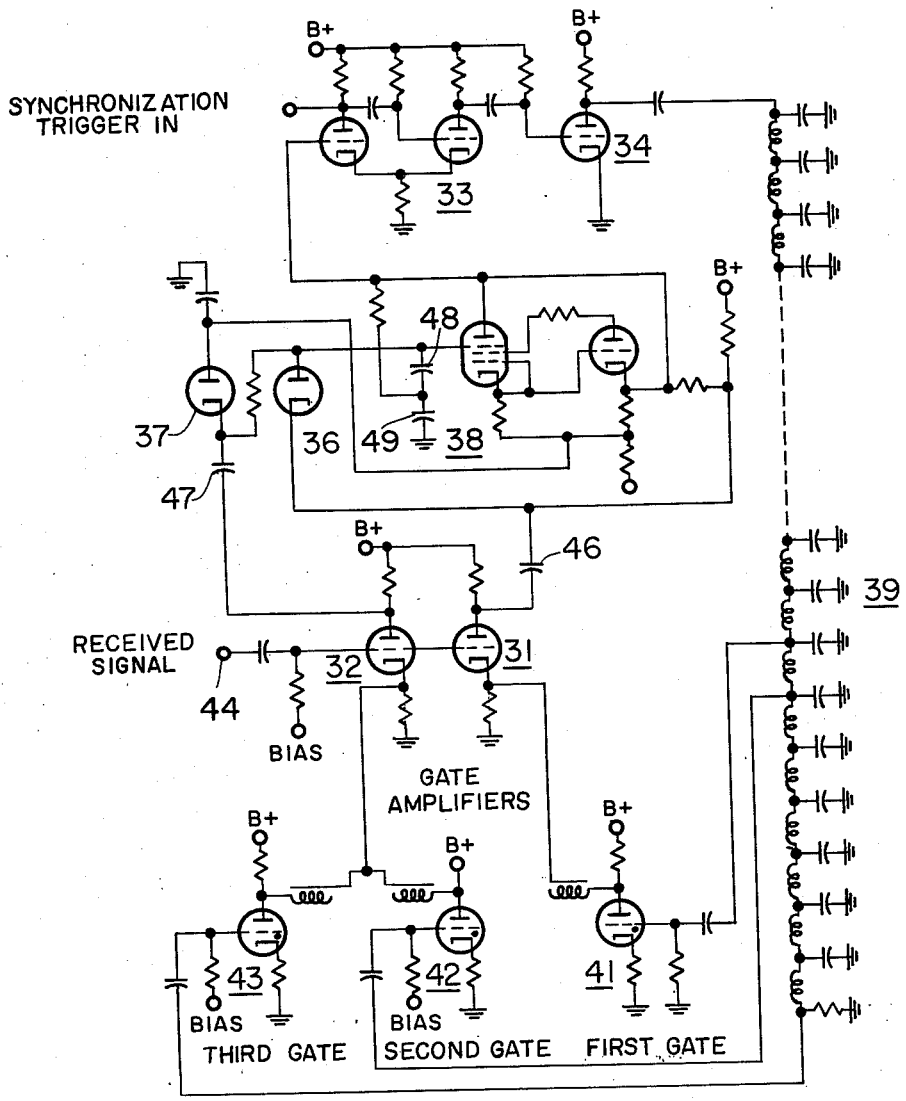
Figure 3:
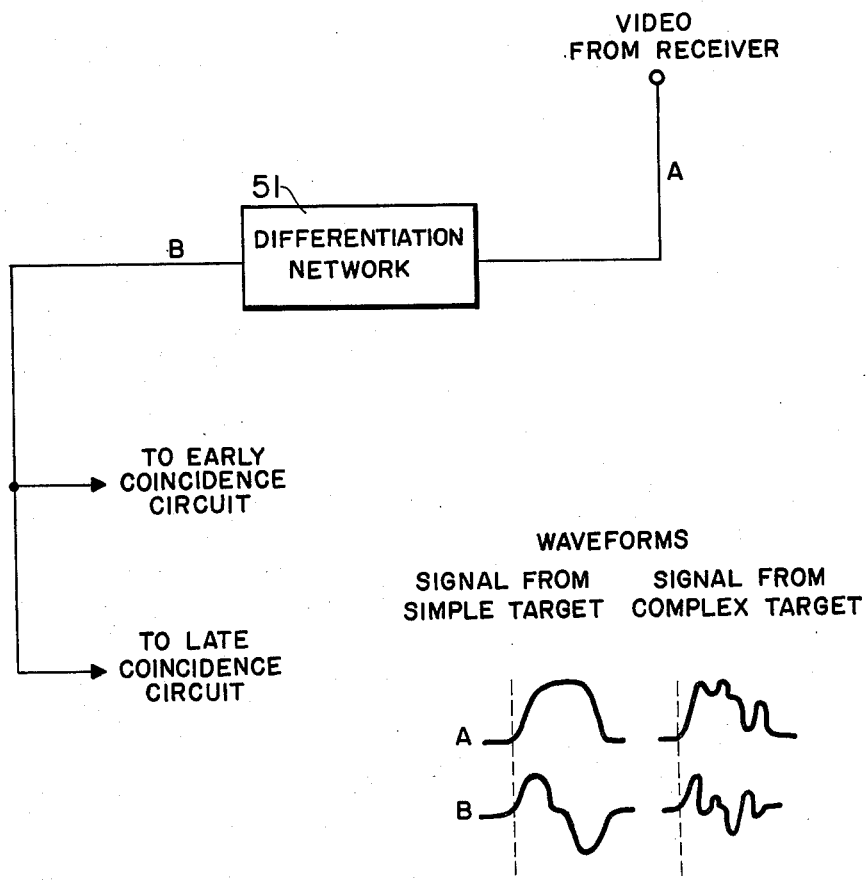
Figure 4:
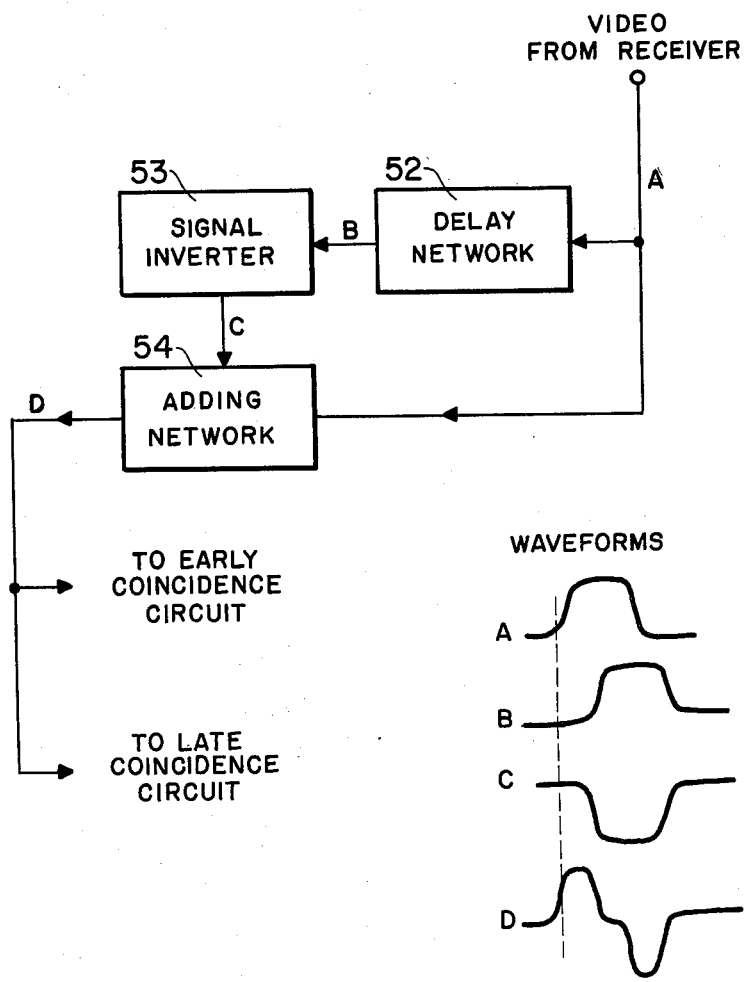
Figure 5:
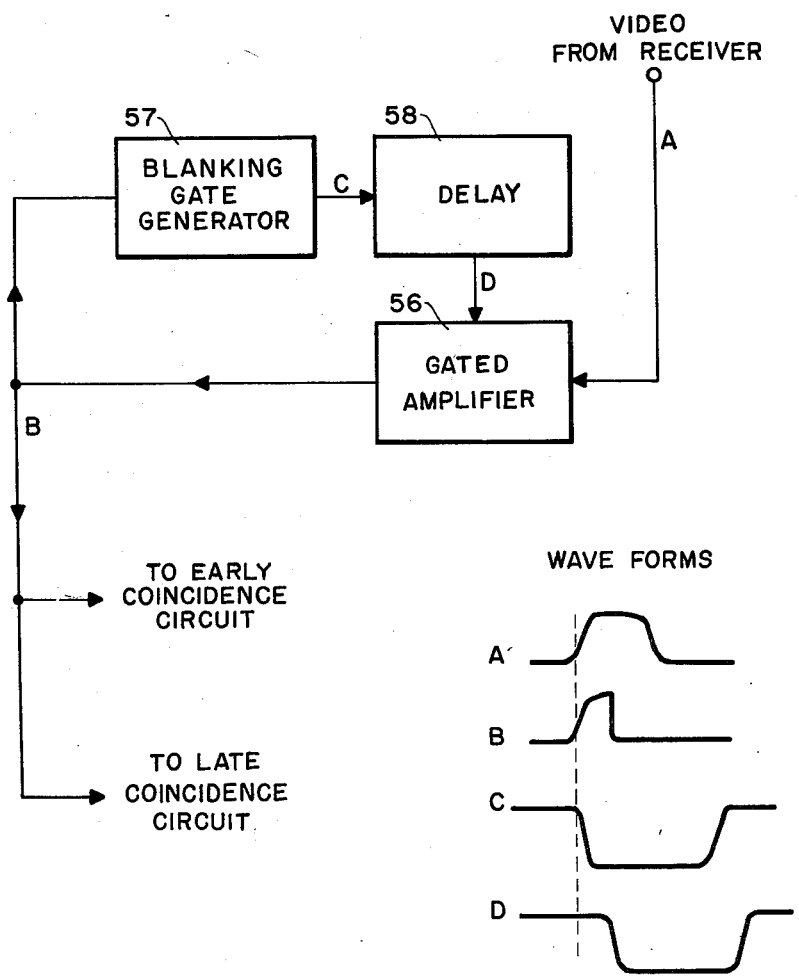

Other objects and many of the attendant advantages of this invention will become more readily appreciated as the same becomes better understood by reference to the following detailed description when considered in connection with the accompanying drawings wherein:

FIGURE 1 is a block diagram of one embodiment of the invention.
FIGURE 2 is a circuit diagram of the embodiment of FIGURE 1.
FIGURE 3 shows a modification of FIGURE 1.
FIGURE 4 shows a second modification of FIGURE 1; and
FIGURE 5 shows a modification of FIGURE 4.

Referring now to the drawings, wherein like reference characters designate like or corresponding parts throughout the several views, there is shown in FIGURE 1 a receiver 10 having an input coupled to antenna 11 and an output coupled to early coincidence circuit 12 and late coincidence circuit 13.

Gate generator 14 is connected directly as a second input to early coincidence circuit 12 and is connected as a second input to late coincidence circuit 13 through delay network 16. The outputs of early coincidence circuit 12 and late coincidence circuit 13 are connected to early and late detectors 17 and 18 respectively. The outputs of early and late detectors 17 and 18 are connected as inputs to control or memory circuit 19. The output of control circuit 19 is connected as the input to gate generator 14 through variable delay circuit 21.

Coincidence circuits 12, 13 may each be a gated amplifier or a conventional diode arrangement which gives an output only when two pulses arrive at its two inputs simultaneously. Coincidence circuits 12, 13 are biased so that the received signals reaching them have no effect on the tracking function unless the signals arrive in time coincidence with applied gate pulses.

Gate generator 14 may be a blocking oscillator or a thyratron pulse forming circuit. Variable delay circuit 21 may be a delay multivibrator or a phantastron circuit and is synchronized by a signal from the radar transmitter or other time sequence initiating device coupled to input terminal 22. The amount of time delay introduced by variable delay circuit 21 is governed by control circuit 19 which may be an integrating capacitor followed by a cathode follower or amplifier. Control circuit 19 also functions as a memory device which carries over an effect associated with one pulsed signal until the next pulsed signal arrives.

In operation, initial adjustment is made (input 23) in control circuit 19 which establishes a delay in variable delay circuit 21 suitable to cause time coincidence of the gate pulse and the desired received signal. The initial adjustment may be made by an operator observing the received signals and the gate pulse of the radar indicator, or it may be effected automatically by an acquisition circuit which causes the variable delay to vary in a hunting action. Coincidence of the received signal and the gate then causes an output signal from the coincidence circuit in which the coincidence arises. This output is passed on to control circuit 19 by way of the applicable detector, which otherwise serves as an isolating device. Control circuit 19 responds by changing the control voltage supplied to variable delay circuit 21. This changes the amount of delay accordingly, and in the next radar cycle the gate generator is triggered earlier or later than in the previous cycle, depending on the direction of the change. Assume the initial adjustment has been made so that the gate is delayed a proper amount to make it coincide in time with the arrival of a particular received signal which is to be tracked and a motion takes place which decreases the range of the signal. This causes the signal to arrive in coincidence with the direct gate supplied to early coincidence circuit 12, but not in coincidence (or only partially in coincidence) with the delay gate supplied to late coincidence circuit 13. Resulting action through detector 17 and control circuit 19 then decreases the length of the variable delay. The decrease of the delay continues so long as a preponderance of the signal meets coincidence with the gate of the early circuit rather than the late. The decrease stops and a balanced condition exists in the system when the signal and the delayed gate at the last coincidence circuit occurs slightly after the center of the signal. In this situation the output signals from the early and late circuits are equal but opposite in direction, and thus cancel each other.

Referring now to FIGURE 2, there is shown a first and second coincidence circuit consisting of a gated amplifier 31 and 32 respectively, delay multivibrator 33 having a peaker tube 34 connected to its output, diode detectors 36, 37, control circuit 38, delay network 39, and first, second and third gates 41, 42 and 43 respectively. Operation of this circuit may be assumed to begin with the gates 41, 42, 43 being brought into time coincidence with a selected received signal (terminal 44) through the action of an external operator or an automatic acquisition circuit (not shown). If gates 41 and 42 are both in full coincidence with the received signal, a pulse will appear at the plate of each gated amplifier 31, 32 and corrections will be fed through detectors 36, 37 to control circuit 38 whose output controls the delay of delay multivibrator 33. Coupling capacitors 46 and 47 have unequal values, so that an output pulse from amplifier 31 causes a greater change to appear across capacitors 48 and 49 of control circuit 38 than does an equivalent pulse at the output of amplifier 32. Since diodes 36 and 37 are connected respectively in series with amplifier 31 and in shunt with amplifier 32, their outputs are opposite in polarity. Thus, under the assumed circumstances the output of detector 36 predominates and is negative. This causes the output voltage of control circuit 38 to be negative which drives delay multivibrator 33 to change in the negative direction and brings about a decrease in the delay. The decrease in delay continues until the first gate appears partially ahead of the signal. At a certain point, which depends on the ratio of capacitors 46 and 47, the decrease in delay brings the first gate partially ahead of the signal to an extent where the early correction is reduced in duration sufficiently so that the negative output of detector 36 becomes equal to the positive output of detector 37. At this point the balanced condition is realized and the decrease in delay ceases. When the balance occurs, output gate of circuit 41 is astride the leading edge of the selected signal received at terminal 44. The above described circuit thus provides a system wherein the corrections derived from coincidence with the early gate are made large with respect to late gate corrections so that balance is achieved when the received signal is only partially in coincidence with the early gate but fully in coincidence with the late gate.

FIGURE 3 shows a modification of FIGURE 1 by providing a differentiation network 51 between receiver 10 and coincidence circuits 12 and 13. The incoming signal shown as waveform A is differentiated so that a shorter signal is derived (waveform B) which corresponds to the fast-rising leading edge of the incoming signal.

FIGURE 4 shows a further modification of FIGURE 1 by providing a feedback clipping or blocking circuit between receiver 10 and coincidence circuits 12 and 13. The circuit comprises delay network 52, signal inverter 53 and adding network 54. As shown by waveforms A, B, C and D, all of the incoming signal is blanked out except for the leading edge.

The modification of FIGURE 5 comprises a gated amplifier 56, blanking gate generator 57 and delay network 58 to provide blocking action as shown by waveforms A, B, C and D. Waveform B is the incoming signal A having all but its leading edge blanked out.

Obviously many modifications and variations of the present invention are possible in the light of the above teachings. It is therefore to be understood that within the scope of the appended claim the invention may be practiced otherwise than as specifically described.

What is claimed is:

In a radar range tracking system the combination comprising:

(a) a first gated amplifier triode having a cathode, anode and grid, (b) a second gated amplifier triode having a cathode, anode and grid, (c) an input terminal coupled to the grids of said first and second gated amplifiers for coupling the received signal of said radar range tracking system thereto, (d) a first capacitor coupling the anode of said first gated amplifier to the cathode of a first diode detector, (e) a second capacitor having a greater value of capacity than said first capacitor coupling the anode of said second gated amplifier to the cathode of a second diode detector, (f) resistor circuit means connecting the cathode of said second diode detector to the anode of said first diode detector and circuit means coupling the anode of said second diode detector to the cathode of said second gated amplifier, whereby said first and second detectors are connected respectively in series with said first gated amplifier and in shunt with said second gated amplifier, (g) control circuit means having first and second cathode to grid coupled amplifier stages, said first amplifier stage having an input connected to the anode of said first diode detector and said second amplifier stage having an output, (h) a variable delay multivibrator having an input connected to the output of said second amplifier stage and having an output, (i) a peaker tube having an anode, cathode and control grid, said control grid being connected to the output of said multivibrator, (j) a delay network having an input connected to the anode of said peaker tube and first, second and third output terminals for providing successively greater time delay of a signal applied to the input terminal, (k) first, second and third gate generating means, (l) said first gate generating means having an input coupled to the first output of said delay network and having an output coupled to the cathode of said first gated amplifier, (m) said second gate generating means having an input coupled to the second output of said delay network, and having an output coupled to the anode of said second gated amplifier, (n) said third gate generating means having an input coupled to the third output of said delay network and having an output coupled to the anode of said second gated amplifier, (o) whereby the output of said first gate generating means will acquire and stay astride the leading edge of a signal received at the input terminal coupled to the grids of said first and second gated amplifier.

References Cited in the file of this patent

UNITED STATES PATENTS 2,605,409     Forbes _____ July 29, 1952
2,886,810     Gleason _____ May 12, 1959

OTHER REFERENCES

Pulse Generator (Glasoe and Lebacqz), published by McGraw-Hill (N.Y.), 1948 (pages 132–134) relied on.

Pulse and Digital Circuit (Millman and Taub), published by McGraw-Hill (N.Y.), 1956 (pages 520–521) relied on.